US011824743B2

(12) United States Patent
Floyd

(10) Patent No.: US 11,824,743 B2
(45) Date of Patent: *Nov. 21, 2023

(54) SELECTIVE TRANSMISSION OF SYSTEM LOG DATA FOR MOBILE PLATFORMS

(71) Applicant: Viasat, Inc., Carlsbad, CA (US)

(72) Inventor: Stuart H. Floyd, Hopkinton, MA (US)

(73) Assignee: Viasat, Inc., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/959,916

(22) Filed: Oct. 4, 2022

(65) Prior Publication Data
US 2023/0102153 A1 Mar. 30, 2023

Related U.S. Application Data

(63) Continuation of application No. 16/960,536, filed as application No. PCT/US2019/014480 on Jan. 22, 2019, now Pat. No. 11,502,924.

(60) Provisional application No. 62/620,061, filed on Jan. 22, 2018.

(51) Int. Cl.
| | |
|---|---|
| *H04L 12/26* | (2006.01) |
| *H04L 43/062* | (2022.01) |
| *G06F 9/455* | (2018.01) |
| *H04L 41/069* | (2022.01) |
| *H04L 43/16* | (2022.01) |
| *H04L 67/12* | (2022.01) |

(52) U.S. Cl.
CPC ........ *H04L 43/062* (2013.01); *G06F 9/45558* (2013.01); *H04L 41/069* (2013.01); *H04L 43/16* (2013.01); *H04L 67/12* (2013.01)

(58) Field of Classification Search
CPC ..... H04L 43/062; H04L 41/069; H04L 43/16; H04L 67/12; G06F 9/45558
See application file for complete search history.

(56) References Cited

U.S. PATENT DOCUMENTS 11,502,924 B2 * 11/2022 Floyd ................. H04L 63/0245
2010/0152962 A1 * 6/2010 Bennett ................. G07C 5/008
701/31.4

(Continued)

FOREIGN PATENT DOCUMENTS

| EP | 2377101 A1 | 10/2011 |
| WO | WO2010071782 A1 | 6/2010 |

*Primary Examiner* — Kim T Nguyen
(74) *Attorney, Agent, or Firm* — Holland & Hart LLP

(57) ABSTRACT

A data transmission system for a mobile platform comprises non-volatile data storage media, a network interface, and control circuitry. The control circuitry is configured to establish a first connection with one or more onboard passenger service devices providing a passenger service at the mobile platform using the network interface. The control circuitry is further configured to receive a set of system log data from the one or more onboard passenger service devices via the network interface and store one or more log signatures in the non-volatile data storage media. The control circuitry is further configured to detect faults fault related to onboard passenger service devices, store transmission rule data that includes rules for filtering system log data, filter the set of system log data based on the transmission rule data, and transmit a subset of system log data to the remote computing device via the network interface.

28 Claims, 5 Drawing Sheets

(56) References Cited

U.S. PATENT DOCUMENTS

2015/0363981 A1 12/2015 Ziarno et al.
2016/0233948 A1* 8/2016 Le Bigot .............. G07C 5/0808

* cited by examiner

SELECTIVE TRANSMISSION OF SYSTEM LOG DATA FOR MOBILE PLATFORMS

CROSS REFERENCE

The present application for patent is a Continuation of U.S. patent Ser. No. 16/960,536 by Floyd, filed Jul. 7, 2020, which is a 371 national stage of International PCT Application No. PCT/US2019/014480 by Floyd filed Jan. 22, 2019, and claims the benefit of U.S. Provisional Patent Application No. 62/620,061 by Floyd, filed Jan. 22, 2018, each of which are assigned to the assignee hereof, and each of which are expressly incorporated by reference in their entirety herein.

BACKGROUND

The present disclosure relates to communication systems, and more particularly to monitoring and/or management of communication systems provided to mobile platforms.

SUMMARY

Described herein are systems, devices, and methods for monitoring data and/or managing transmission of data at mobile platforms including vehicles.

Some implementations of the present disclosure relate to a data transmission system for a mobile platform, the data transmission system comprising non-volatile data storage media, a network interface, and control circuitry configured to establish a first connection with one or more onboard passenger service devices using the network interface. The one or more passenger service devices are configured to facilitate provision of a passenger service at the mobile platform. The control circuitry is further configured to receive a set of system log data from the one or more onboard passenger service devices via the network interface and store one or more log signatures in the non-volatile data storage media. The one or more log signatures comprise conditions for detecting faults. The control circuitry is further configured to detect, based on comparing the set of system log data to a first log signature of the one or more log signatures, a first fault related to a first onboard passenger service device of the one or more onboard passenger service devices and store a first set of transmission rule data in the non-volatile data storage media. The first set of transmission rule data includes one or more rules for filtering system log data. The control circuitry is further configured to, in response to detecting the first fault, filter the set of system log data based on the first set of transmission rule data to generate a subset of system log data, establish a second connection with a remote computing device using the network interface, and transmit the subset of system log data to the remote computing device via the network interface.

The first set of transmission rule data may be fault-specific and the one or more rules for filtering system log data may be associated with the first fault. In some embodiments, the control circuitry is further configured to receive the one or more fault signatures from the remote computing device via the network interface. The control circuitry may be further configured to receive the first set of transmission rule data from the remote computing device via the network interface.

In some embodiments, the control circuitry is further configured to receive troubleshooting instruction data from the remote computing device via the network interface in response to the subset of system log data. The control circuitry may be further configured to, in response to receiving the troubleshooting instruction data, transmit one or more commands to a first onboard passenger service device of the one or more onboard passenger service devices based on the troubleshooting instruction data, via the network interface. In some embodiments, the one or more commands comprise a request to restart the first onboard passenger service device. The control circuitry may be further configured to, in response to receiving the troubleshooting instruction data: establish a third connection with one or more service access devices onboard the mobile platform; and transmit, via the network interface, message data to at least one of the one or more service access devices based on the troubleshooting instruction data. In some embodiments, the one or more service access devices comprise one or more personal electronic devices, seatback systems, or crew devices.

The control circuitry may be further configured to receive location data for the mobile platform via the network interface. In some embodiments, the control circuitry is further configured to filter the set of system log data based on the location data. The one or more onboard passenger service devices may comprise one or more wireless access points, servers, and modems.

Some implementations of the present disclosure relate to a data transmission system comprising non-volatile data storage media storing a transmission rule library comprising transmission rule data and troubleshooting instruction data, a network interface, and control circuitry configured to transmit, via the network interface, a first set of transmission rule data to a remote computing device onboard a mobile platform. The first set of transmission rule data provides instructions for filtering system log data. The control circuitry is further configured to receive from the mobile platform, via the network interface, a set of system log data generated at the mobile platform. The set of system log data is related to passenger service devices onboard the mobile platform and the set of system log data satisfies the set of transmission rule data. The control circuitry is further configured to identify a cause of a first fault related to the passenger service devices based on the set of system log data and transmit, via the network interface, a set of troubleshooting data to the remote computing device. The set of troubleshooting data is associated with the identified cause of the first fault.

The first set of transmission rule data may be fault-specific and provides instructions for filtering system log data related to the first fault. In some embodiments, the first set of transmission rule data comprises rules for filtering out data that is unrelated to a first performance metric. The first performance metric may be one of data rate, ping latency, data usage, ping success, and load time. In some embodiments, identifying the cause of the first fault may involve comparing the set of system log data to threshold values for the first performance metric. The control circuitry may be further configured to update the transmission rule library based on the identified cause of the first fault.

Some implementations of the present disclosure relate to a method of managing data transmission on a mobile platform, the method comprising receiving a set of system log data from one or more passenger service devices onboard the mobile platform via a network interface. The set of system log data relates to a passenger service provided on the mobile platform. The method further comprises storing one or more log signatures in a non-volatile data storage media. The one or more log signatures comprise conditions for detecting faults. The method further comprises detecting, based on comparing the set of system log data to a first log signature of the one or more log signatures, a first fault related to a first onboard passenger service device of the one or more passenger service devices and storing a first set of transmission rule data in the non-volatile data storage media. The first set of transmission rule data includes one or more rules for filtering system log data. The method further comprises, in response to detecting the first fault, filtering the set of system log data based on the first set of transmission rule data to generate a subset of system log data and transmitting the subset of system log data to the remote computing device via the network interface.

The first set of transmission rule data may be fault-specific and the one or more rules for filtering system log data may be associated with the first fault. In some embodiments, the method further comprises receiving the one or more fault signatures from the remote computing device via the network interface. The method may further comprise receiving the first set of transmission rule data from the remote computing device via the network interface.

In some embodiments, the method further comprises receiving troubleshooting instruction data from the remote computing device via the network interface in response to the subset of system log data. The method may further comprise, in response to receiving the troubleshooting instruction data, transmitting one or more commands to a first passenger service device of the one or more passenger service devices based on the troubleshooting instruction data, via the network interface. In some embodiments, the one or more commands comprise a request to restart the first passenger service device. The method may further comprise, in response to receiving the troubleshooting instruction data, transmitting, via the network interface, message data to at least one of one or more service access devices onboard the mobile platform based on the troubleshooting instruction data. In some embodiments, the one or more service access devices comprise one or more personal electronic devices, seatback systems, or crew devices.

The method may further comprise receiving location data for the mobile platform via the network interface. In some embodiments, the method further comprises filtering the set of system log data based on the location data. In some embodiments, the one or more passenger service devices comprise one or more wireless access points, servers, and modems.

For purposes of summarizing the disclosure, certain aspects, advantages and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
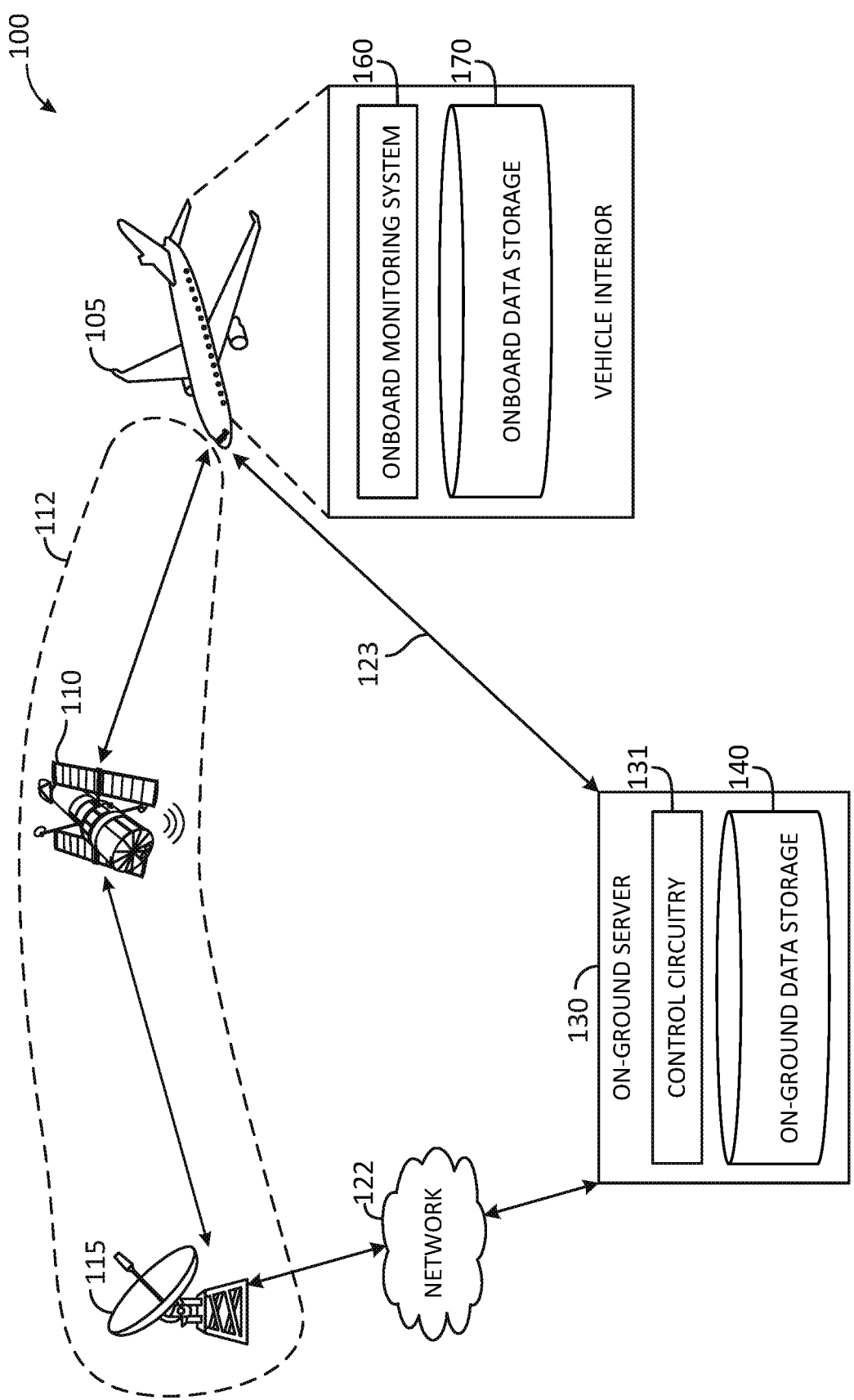
FIG. 1 illustrates a system for managing transmission of data between a mobile platform, such as a vehicle, and an on-ground server, in accordance with one or more embodiments.

The headings provided herein are for convenience only and do not necessarily affect the scope or meaning of the claimed invention. In certain implementations, the present disclosure relates to systems, devices and methods for managing and/or transferring system log data related to a passenger service (e.g., provided onboard a mobile platform) to and/or from onboard monitoring systems of mobile platforms.

The present disclosure provides devices, systems, and processes for monitoring and/or management of system log data, which may involve fault detection and/or transmission (e.g., in response to fault detection) of data related to fault detection between mobile platforms (e.g., vehicles) and remote (e.g., on-ground) servers. In optional embodiments, remote servers may include servers onboard other mobile platforms. Generally, various system log data may be collected, aggregated, filtered, analyzed, and/or otherwise processed at various computing devices (e.g., servers) onboard a mobile platform and transmitted from the mobile platform to remote servers. Similarly, various system log data may be collected, aggregated, filtered, analyzed, and/or otherwise processed at various on-ground computing devices and transmitted from the on-ground computing devices to computing devices onboard mobile platforms. Computing systems onboard mobile platforms may be further configured to receive various data transmissions from remote servers while remote servers may be configured to receive various data transmissions from computing systems onboard mobile platforms. Received data may be collected, aggregated, filtered, analyzed (e.g., to detect faults), and/or otherwise processed onboard mobile platforms and/or at on-ground computing systems.

In some embodiments, received and/or generated system log data may be filtered to remove data that may be unnecessary and/or less useful for detecting and/or diagnosing faults related to a passenger service provided on a mobile platform. In some embodiments, faults may be detected prior to filtering and/or transmission of data. Filtering of a system log data set may be performed prior to transmission of the data set to a remote server. In some embodiments, data may be filtered in accordance with transmission rule data associated therewith. Such transmission rule data may be generated locally and/or obtained from remote computing systems. For example, transmission rule data may be generated at a data monitoring server onboard a mobile platform and/or may be generated by a remote server and transmitted to the mobile platform.

Transmission rule data may provide criteria and/or instructions for filtering system log data generated and/or received at an onboard server, and may be used for identifying data which may be of particular significance in identifying and/or responding to faults relating to a passenger service provided onboard a mobile platform. A "fault," as used herein, may be any misperformance and/or decrease in status and/or performance of one or more passenger service devices (which may include, e.g., wireless access points (WAPs), onboard servers, modems, etc.) onboard a mobile platform. For example, a fault may indicate that a passenger service device is in a degraded and/or malfunctioning state and may need to be replaced, updated, rebooted/restarted, and/or fixed. In another example, a fault may be indicative of conditions (e.g., weather conditions) hindering performance of one or more passenger service devices. In some embodiments, a fault may result in a failure, disruption, and/or other performance issue related to a passenger service provided onboard a mobile platform. Examples of faults may include failed transmissions from a passenger service device, failed data delivery at a passenger service device, low speed and/or quality of data transmissions to and/or from a passenger service device, etc. Faults may have any of a variety of causes, which may include degradation of passenger service devices, objects (e.g., a tail of an aircraft) and/or weather conditions blocking and/or disrupting transmissions of data from passenger service devices, and outdated software installed on passenger service devices, among many others. A "passenger service device" or "onboard passenger service device," as used herein, may be any onboard device configured to generate system log data and/or facilitate provision of a passenger service onboard a mobile platform. In some embodiments, passenger service devices may not include engines and other equipment unrelated to passenger services provided at a mobile platform.

Faults related to passenger service devices on a mobile platform may result in performance issues of a passenger service provided onboard the mobile platform. A "passenger service" may involve provision of various electronic services onboard a mobile platform for access by passengers and/or crew members through use of personal electronic devices (PEDs), crew member devices, and/or entertainment systems (e.g., seatback entertainment systems in the case of aircrafts). Electronic services provided through a passenger service may be stored locally at the mobile platform and/or obtained from satellites and/or remote servers and may include various media content items (e.g., film and/or television content) and/or wireless and/or wired access (e.g., Wi-Fi) to the Internet or other network. Internet and/or other network services may be provided through use of a modem and/or other device(s) onboard the mobile platform which may be in communication with a satellite or other device external to the mobile platform. Media content items for presentation on a vehicle or other mobile platform can originate from disparate remote sources, such as remote (e.g., on-ground) servers. For vehicle onboard content presentation platforms, or other mobile platforms, server(s) may be locally installed, wherein such server(s) receive the content for presentation as one or more data transfer packages from one or more remote media servers. For example, an onboard server may be configured to pull in various content services and solutions together to provide a desirable end user experience for passengers onboard the vehicle or other mobile platform. Different types of content items for presentation onboard a vehicle or other mobile platform may include, for example, on-demand video or text content (e.g., in-flight entertainment), broadcast television or other broadcast content, product catalog information, or other types of content. Such content items may be received from one or more on-ground servers, which in turn may receive the different types of content items from different content sources.

Detection of faults related to a passenger service devices may involve comparison of system log data (e.g., obtained from passenger service devices) to fault signatures stored locally at a mobile platform and/or obtained from remote servers. A "fault signature" may be any set of conditions for detecting a fault. Each fault signature may be associated with a particular fault. For example, a first fault signature may comprise conditions for detecting a first fault (e.g., failed transmissions at a modem). Fault signatures may be generated automatically through analysis of system log data and/or may be provided by users.

In some embodiments, detecting a fault may be performed separately from identifying a cause of the fault. For example, performance of passenger service devices may be monitored by a data monitoring server that may be configured to obtain and/or analyze system log data indicative of performance of the passenger service devices. While monitoring data, the data monitoring server may detect a fault corresponding to abnormal and/or suboptimal values (e.g., in comparison to various fault signatures) represented by the monitored data. For example, the monitored data may indicate data rate values that fall below a threshold (i.e., target) data rate value included in one or more fault signatures. In response to detecting the fault, the data monitoring server may further analyze the data to identify a cause of the fault and/or may transmit the data to a remote server for further analysis to identify a cause of the fault.

Identifying causes of faults may involve recognition of patterns of data indicative of particular causes. For example, system log data generated during a trip of an aircraft may be collected and analyzed. If it is known that, during the trip, the tail of the aircraft was blocking transmission for at least part of the trip, the system log data may be analyzed to determine a pattern associated with the part of the trip that transmissions were blocked. The determined pattern may then be applied to sets of system log data from other mobile platforms and/or other trips to determine if a similar cause is associated with the other mobile platforms and/or trips.

After a fault is detected, a set of system log data may be evaluated against transmission rule data to generate a subset of data that may be transmitted to one or more remote servers. "Transmission rule data" may comprise various criteria and/or rules for filtering system log data in response to detected faults. In some embodiments, transmission rule data may be fault-specific and/or associated with certain faults. For example, a first set of transmission rule data may be designated for use in filtering system log data associated with a first fault (e.g., failed transmission at a modem). Transmission rule data may be applied to a data set to generate a subset of data that may include any data necessary for recognizing determined data patterns, particularly data patterns associated with one or more faults associated with the data set. Data that is unnecessary or less useful for recognizing determined data patterns may be excluded from the subset.

Embodiments described herein may provide improved efficiency and/or performance of data transmission and/or data management in a variety of ways. By performing fault detection onboard mobile platforms, data transmissions related to troubleshooting faults may be limited to situations in which faults have occurred. For example, system log data may be transmitted to remote servers in response to detection of a fault rather than on a periodic or continuous basis. Moreover, filtering system log data based on transmission rule data may advantageously limit the amount of data transmitted to remote servers to data that is highly useful for identification of and/or responding to causes of detected faults. In some cases, data transmission pipelines between onboard servers and remote servers may have limited capacity and/or may improve in performance with lower quantities of data. Moreover, higher quantity of transmitted data may correlate to higher operation cost. Accordingly, by limiting data transmission to highly useful data, the systems and methods described herein may advantageously improve efficiency of performance and/or cost of data transmissions to and/or from mobile platforms while also providing effective identification of causes of faults.

Effective troubleshooting of detected faults related to passenger service devices may require access to system log data. In order to respond to faults in a timely manner, troubleshooting may be preferably performed during a trip of a vehicle to maximize a user experience of the passenger service. Due to the often brief nature of trips of vehicles, real-time and/or near-real-time transmission of system log data for troubleshooting purposes is highly advantageous. By limiting the data transmitted for troubleshooting purposes, efficiency and/or performance of troubleshooting functions may be increased.

Transmission rule data may comprise various criteria and/or rules which must be satisfied for data to be included in subsets of data which may be transmitted to remote servers. Various transmission rules can include, among many others, thresholds for performance metric values and/or types of performance metric values (e.g., only data rate values may be included in subsets). Transmission rules may relate to patterns of system log data associated with faults and/or causes of faults. For example, transmission rules may allow only data matching target values and/or meeting threshold values to be included in data subsets. The target and/or threshold values may be determined based on established patterns of system log data which may be automatically generated (e.g., through analysis of previously-obtained system log data) and/or manually submitted by users.

In some embodiments, system log data transmitted between mobile platforms and remote servers may relate to health/status information of various passenger service devices onboard a mobile platform. For example, system log data may include status updates transmitted from passenger service devices to onboard servers. In some cases, a failure to transmit a status update may be indicative of a fault (e.g., an impaired state) associated with a passenger service device. System log data obtained at a remote server from a mobile platform may be used to trigger an update and/or generate troubleshooting instructions for improving performance at one or more passenger service devices.

Data Monitoring System

In some implementations, the present disclosure provides systems, processes, and devices that provide for monitoring and/or management of data related to a passenger service provided onboard a mobile platform. FIG. 1 illustrates a system 100 for managing transmission of data between a mobile platform 105, such as a vehicle, and an on-ground server 130, in accordance with one or more embodiments. Various data may be stored in an on-ground data store 140 and/or an onboard data store 170. Types of data stored at the on-ground server 130 and/or at the mobile platform 105 are described in further detail in FIGS. 2 and 3. The on-ground data store 140 and/or onboard data store 170 may comprise non-volatile data storage.

The system 100 includes an onboard data monitoring system 160, which may be installed in, and/or disposed on or in, a mobile platform 105, such as an aircraft, cruise ship, automobile, or other vehicle or the like. Although certain embodiments are disclosed herein in the context of aircraft, or other vehicles, it should be understood that the principles disclosed herein may be applicable to any suitable or desirable mobile platform or vehicle. The onboard data monitoring system 160 may be configured to filter and/or transmit sets of system log data which may be received at the onboard monitoring system 160 and/or stored in onboard data storage 170. The system log data may be filtered based on resolution of certain transmission rule data which may be generated and/or received at the onboard monitoring system 160 and/or stored in the onboard data storage 170. The system log data comprise various log data obtained from one or more passenger service devices onboard the mobile platform. The one more passenger service devices may be configured to facilitate provision of a passenger service at the mobile platform and may include one or more modems, WAPs, entertainment systems (e.g., seatback entertainment systems in the case of aircraft-based embodiments), and/or other onboard devices.

System log data received from various passenger service devices onboard the mobile platform 105 may relate to a passenger service provided on a mobile platform 105. In some embodiments, system log data may comprise performance data values relating to any of a variety of performance metrics, which may include data rate, latency, number of service access devices (e.g., PEDs, crew devices, seatback entertainment systems) connected to the passenger service, packet loss rate, throughput, availability of the passenger service, and/or signal quality. System log data may further include device status data received from passenger service devices. Device status data may include status updates transmitted from the various passenger service devices. In some embodiments, a failure of a passenger service device to send a status update may be considered status data.

The system 100 may provide for the periodic or sporadic updating and/or replacing of the transmission rule data and/or system log data stored at the onboard data storage 170 in response to newly obtained data. For example, in certain embodiments, the obtaining of various data (e.g., transmission rule data) may be performed at least in part over a network connection external to the vehicle 105, such as through a satellite network connection 112 and/or another type of network connection 123 with the Internet or other network 122 (e.g., Wi-Fi or other network connection). The network connection 112 may include a communication path between a satellite 110 and a gateway 115. The gateway 115 may be in data communication with the satellite 110 as well as to the network 122, and thereby to the on-ground server 130. The mobile platform 105 may be configured to receive a forward downlink signal from the satellite access network 112 including the satellite 110 and gateway 115, and to transmit a return uplink signal to the satellite-based access network 112 using the satellite 110 and the gateway 115.

The network 122 can be any type of network and can include, for example, one or more of: the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, a cellular network, and/or any other type of network supporting communication as described herein. Furthermore, the network 122 can include both wired (e.g., copper and optical) and wireless (e.g., radio and microwave) connections.

The system 100 further comprises an on-ground server 130 that comprises control circuitry 131 which may be configured to perform a variety of functions. In some embodiments, the control circuitry 131 may be configured to generate transmission rule data (e.g., through use of rule engine circuitry) that may be transmitted to the mobile platform 105. In some embodiments, the onboard monitoring system 160 may also or alternatively comprise rule engine circuitry for generation of transmission rule data which may be stored at the onboard data storage 170.

The on-ground server 130 and/or onboard monitoring system 160 may include rules engine circuitry configured to generate transmission rule data using, among other things, system log data obtained from passenger service devices onboard the mobile platform 105. Rule engine circuitry may provide transmission rule data that can effectively limit the quantity of data transmitted between the on-ground server 130 and the mobile platform 105 and can effectively identify data that may be useful in detecting and/or identifying causes of faults.

The mobile platform 105 is illustrated in FIG. 1 as an airplane, and certain embodiments are disclosed herein in the context of airplanes, fleets of airplanes, and/or airlines. However, it should be understood that embodiments of the present disclosure are applicable to other types and/or groupings of mobile platforms, and/or associated entities.

As described above, with respect to the mobile platform 105, the on-ground server 130 may represent a remote server. Although referred to herein as an on-ground server, the server 130 may be physically disposed and/or situated in any physical location; use of the term "on-ground" herein is for simplicity and convenience to indicate that the on-ground server 130 is not disposed on or at the mobile platform 105, but rather external thereto at some location. The on-ground server 130 may be understood with respect to the on-ground server 230 of FIG. 2, which may constitute an example embodiment of the on-ground server 130 of FIG. 1. With respect to FIG. 1, transmission rule data and various other data (e.g., media content items) can be obtained by the mobile platform 105 from the on-ground server 130 via the network 122 or other terrestrial stations, gateways, or other network nodes, or the like.

Figure 2:
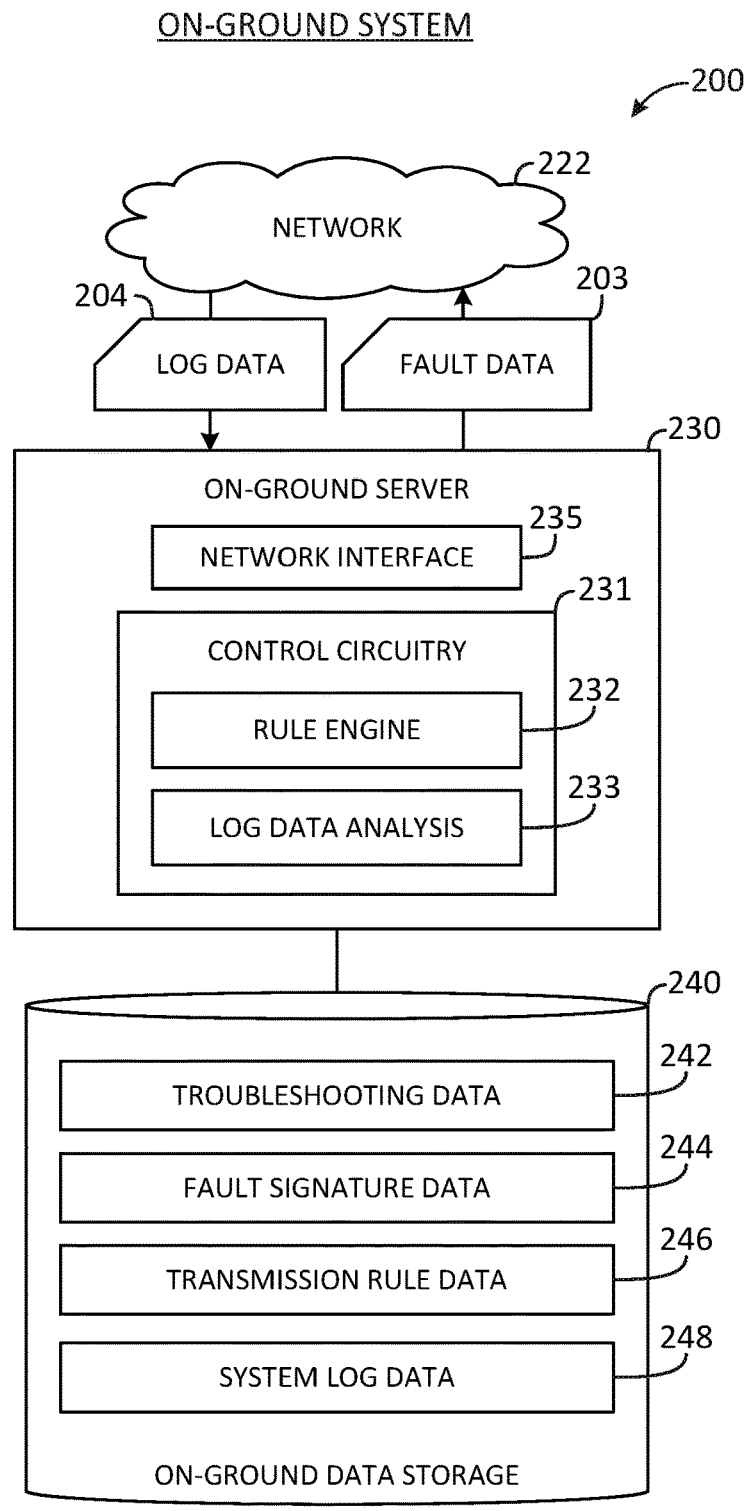
FIG. 2 illustrates an on-ground monitoring system in accordance with one or more embodiments.

FIG. 2 illustrates an on-ground monitoring system 200 in accordance with one or more embodiments. With reference to FIG. 2, the on-ground server 230 may comprise control circuitry 231, which may be used to generate transmission rule data 246 and/or analyze system log data 204 obtained from mobile platforms related to a passenger service provided on particular mobile platforms (e.g., the mobile platform 105 of the system 100 described above). While the on-ground server 230 and on-ground data storage 240 are shown as separate components in FIG. 2, the on-ground server 230 and on-ground data storage 240 may be combined into a single device or may be different devices. Log data analysis 233 circuitry may be configured to analyze system log data 204 (which may include fault detection data) obtained from a mobile platform. Fault detection data obtained from a mobile platform may be indicative of analysis performed at the mobile platform. For example, devices onboard a mobile platform may be configured to analyze system log data to detect faults related to a passenger service provided onboard the mobile platform. In some embodiments, detection of a fault may prompt generation of events and/or other actions directed to transmitting system log data to remote servers (e.g., the on-ground server 230). When a fault is detected onboard a mobile platform, the mobile platform may generate a ticket or other indicator that may be included with system log data transmitted to the on-ground server 230. In this way, the on-ground server 230 may not be required to repeat analysis performed at the mobile platform and may make use of the fault detection data generated at the mobile platform.

System log data 204 generated at mobile platforms may be transmitted via a network 222 to the on-ground server and may be stored in on-ground data storage 240 (see system log data 248). The log data analysis 233 circuitry may be configured to analyze obtained system log data 204 to diagnose causes of faults associated with a passenger service. In some embodiments, diagnosis of causes of faults may involve comparison of system log data 248 to threshold (i.e., target) values and/or established patterns of log data associated with known causes of suboptimal performance. For example, certain causes of faults (e.g., a tail of an aircraft blocking transmission to and/or from the aircraft) may be known to have associated patterns of system log data that may be recognized in obtained sets of system log data. If system log data 204 obtained from a mobile platform matches a known pattern of stored system log data 248, a cause associated with the known pattern may be diagnosed for the obtained system log data 204. In optional embodiments, analysis of system log data 204 may be performed at least in part by users (e.g., technicians).

When a cause of a fault is detected, stored troubleshooting data 242 associated with the identified cause may be accessed from the on-ground data storage 240. Troubleshooting data 242 may comprise instruction data providing instructions for responding to and/or correcting identified causes of faults. For example, the troubleshooting data 242 may provide instructions to restart a passenger service device (e.g., a modem) if the identified cause of suboptimal performance is a faulty/malfunctioning modem. Each set of troubleshooting data 242 may be associated with one or more causes of faults. Each set of troubleshooting data may be stored with an association (e.g., a pointer) to one or more specific causes of faults. In this way, when a cause of a fault is determined, a particular set of troubleshooting data (i.e., instructions for responding to the fault) may be effectively determined and transmitted (e.g., via the network interface 235) as and/or along with other fault data 203 to a mobile platform experiencing the fault.

The control circuitry 231 (e.g., the rule engine 232 circuitry) of the on-ground server 230 may be further configured to generate transmission rule data 246. Transmission rule data 246 may be generated based on analysis (e.g., by the log data analysis 233 circuitry) of system log data 248 obtained from one or more mobile platforms. For example, through analysis of system log data 248, it may be determined that a particular pattern of system log data 248 is associated with a particular cause of a detected fault, such as a tail or other portion of a vehicle blocking data transmissions between the vehicle and a satellite. The rule engine 232 circuitry may be configured to generate transmission rule data 246 that, when implemented, selects data which can be used to determine if the particular pattern of system log data 248 is present in a given data set and excludes other unnecessary data.

Patterns of data may be indicative of comparisons between a set of data and one or more thresholds. For example, system log data 248 comprising values for a particular performance metric (e.g., data rate) may be compared against one or more threshold data rate values (e.g., service level agreement (SLA) requirement thresholds) to determine which values satisfy (i.e., pass) the thresholds and which do not (i.e., fail). One or more pass/fail results may be aggregated to generate a pattern of pass/fail results related to the particular performance metric. The rule engine 232 circuitry may be configured to generate transmission rule data 246 that, when implemented, selects data that can be used to detect the pattern of results.

The network 222 may comprise a wide area network, such as the Internet, which may be accessed by a mobile platform via a satellite communication network. Therefore, the communication link between the on-ground server 230 and a remote mobile platform may be achieved over the Internet or other wide area network. Transmission and/or reception of data between the network 222 and the on-ground server 230 may be facilitated via a network interface 235 configured to establish a network connection between the network 222 and the on-ground server 230.

In some embodiments, transmission of system log data 204 from a mobile platform to the on-ground server 230 may compete with other data transfer needs of the mobile platform served by such network, which may prevent or impede an acceptable user experience from being provided. For example, such other data transfer needs may involve requests for data from passengers currently onboard the mobile platform. In certain embodiments, the on-ground server 230 may be configured to generate (e.g., at the rule engine 232 circuitry) transmission rule data 246 which may be implemented by mobile platforms to minimize data transfers, including transmission of system log data 204, thereby improving efficiency and/or utilization of available resources.

System log data 204 obtained from one or more mobile platforms may be analyzed at the on-ground server 230 (e.g., at the log data analysis 233 circuitry and/or rule engine 232 circuitry) to identify causes of faults and/or generate rules for identifying system log data 204 that may be of particular significance in diagnosing causes of faults. For example, stored system log data 248 representing a period of time during which a tail of an aircraft was blocking transmission to a satellite may be analyzed to determine patterns of data associated with blocked transmissions.

In some embodiments, transmission rule data 246 may be automatically-generated through detection of patterns in system log data 248. Automatically-generated transmission rule data 246 may be iteratively updated as new system log data 204 is received from mobile platforms and/or new rule data is generated by the rule engine 232 circuitry. For example, transmission rule data 246 may be fine-tuned as new system log data 204 arrives. With increased quantity of system log data, an ability of the rule engine 232 circuitry to detect patterns in the system log data may be increased. Accordingly, automatically-generated transmission rule data 246 may become more precise over time and/or may determine more and more types of system log data that may be filtered out of transmissions. In optional embodiments, transmission rule data 246 may be provided as input by users (e.g., technicians). For example, users may access a user interface configured for receiving rule input from users. User-inputted transmission rule data 246 may be utilized by a data filter onboard a mobile platform to determine which data may be excluded from data transmissions.

The log data analysis 233 circuitry may be configured to detect faults and/or causes of faults based on system log data 204 received from mobile platforms. In some embodiments, fault and/or cause detection may involve comparing performance metric values included in system log data 204 with fault signature data 244, which may include threshold (i.e., target) values for various performance metrics.

In some embodiments, system log data 204 may be indicative of performance metrics (e.g., data rate values, latency values, number of connected service access devices, etc.) for a passenger service provided onboard a mobile platform. System log data 204 may further include location data of the mobile platform and/or device status data for devices onboard the mobile platform. In some embodiments, collected system log data 248 may be stored in the onboard data storage. Threshold (e.g., target) values for a variety of performance metrics may be stored in the data storage 240 as fault signature data 244. For example, the fault signature data 244 may include a threshold data rate value and any system log data 204, including data rate values, received at the on-ground server 230 for a passenger service may be aggregated and/or compared to the threshold data rate value. If the received values are below the threshold value, the log data analysis 233 circuitry may detect a fault and/or a cause of a fault related to the passenger service.

In some embodiments, the service status evaluator may aggregate passenger service data for a passenger service. For example, in some embodiments, the service status evaluator may generate an average, maximum, minimum, mean, and/or median of passenger service data for two or more performance metrics. The service status evaluator may determine negative variances between passenger service data of a vehicle being monitored as it proceeds along its travel route. Such negative variances may themselves be aggregated to produce summary metrics (for example, one metric) representing a difference in performance of a passenger service of the monitored vehicle compared to threshold values. In some embodiments, aggregation of negative variances may be divided by the duration of the given trip to the present point to provide an average negative variance experienced during the trip.

The log data analysis 233 circuitry may compare aggregated system log data 204 to threshold values, which may include threshold values for certain performance metrics. For example, threshold values may be stored as fault signature data 244, and may be accessed by the log data analysis 233 circuitry or other component. The threshold values may include values associated with SLAs and/or other target performance measures of the passenger service, and may represent a variety of measurement types. In one embodiment, a threshold value may represent a target data rate, or a target percentage of time the target data rate is achieved. The log data analysis 233 circuitry may gather data rate statistics over a period of, for example, an entire trip of a vehicle and may compare the statistics to data rate threshold values stored in the on-ground data storage 240. Based on the comparison, the log data analysis 233 circuitry may detect faults and/or causes of faults.

In some embodiments, system log data 204 associated with one or more performance metrics may be compared against a multi-tiered threshold scheme, such as a two-tiered threshold scheme. For example, the fault signature data 244 may include a first threshold indicating that a first data rate value should be achieved for at least a first percentage of a given trip, and a second (e.g., lower) data rate value should be achieved for at least a second (e.g., lower) percentage of the trip. If both the first data rate and second data rate targets are met, the log data analysis 233 circuitry may not detect a fault, whereas if either or both of the first data rate and the second data rate targets are not met, the log data analysis 233 circuitry may detect a fault. Moreover, a particular pattern of pass/fail results relative to a single and/or multi-tier threshold scheme may be associated with a particular known cause of faults. Accordingly, if system log data 204 matches a particular pattern, a cause of a fault indicated by the system log data 204 may be determined.

Fault signature data 244 may be transmitted from the on-ground server 230 to mobile platforms for use in detection of faults and/or causes of faults at the mobile platforms. In some embodiments, fault signature data 244 may be generated automatically by analysis of system log data 248 to determine patterns of data indicative of suboptimal performance of a passenger service. In optional embodiments, fault signature data 244 may be provided by users.

In some embodiments, system log data 204 may be transmitted form mobile platforms to the on-ground server in response to one or more requests transmitted by the on-ground server 230. Additionally or alternatively, mobile platforms may automatically send system log data 204 without requiring requests from the on-ground server 230. For example, system log data 204 may be transmitted periodically and/or sporadically by mobile platforms. In some embodiments, mobile platforms may transmit system log data 204 in response to detections of faults at the mobile platforms.

In some embodiments, the log data analysis 233 circuitry and/or other components of the on-ground server may be configured to generate time-series graphs and/or other data for representing values included in obtained and/or stored system log data. Representations of system log data may be presented in user interfaces for use by users in detecting faults and/or causes of faults, for generating transmission rule data, and/or for generating fault signature data 244.

Figure 3:
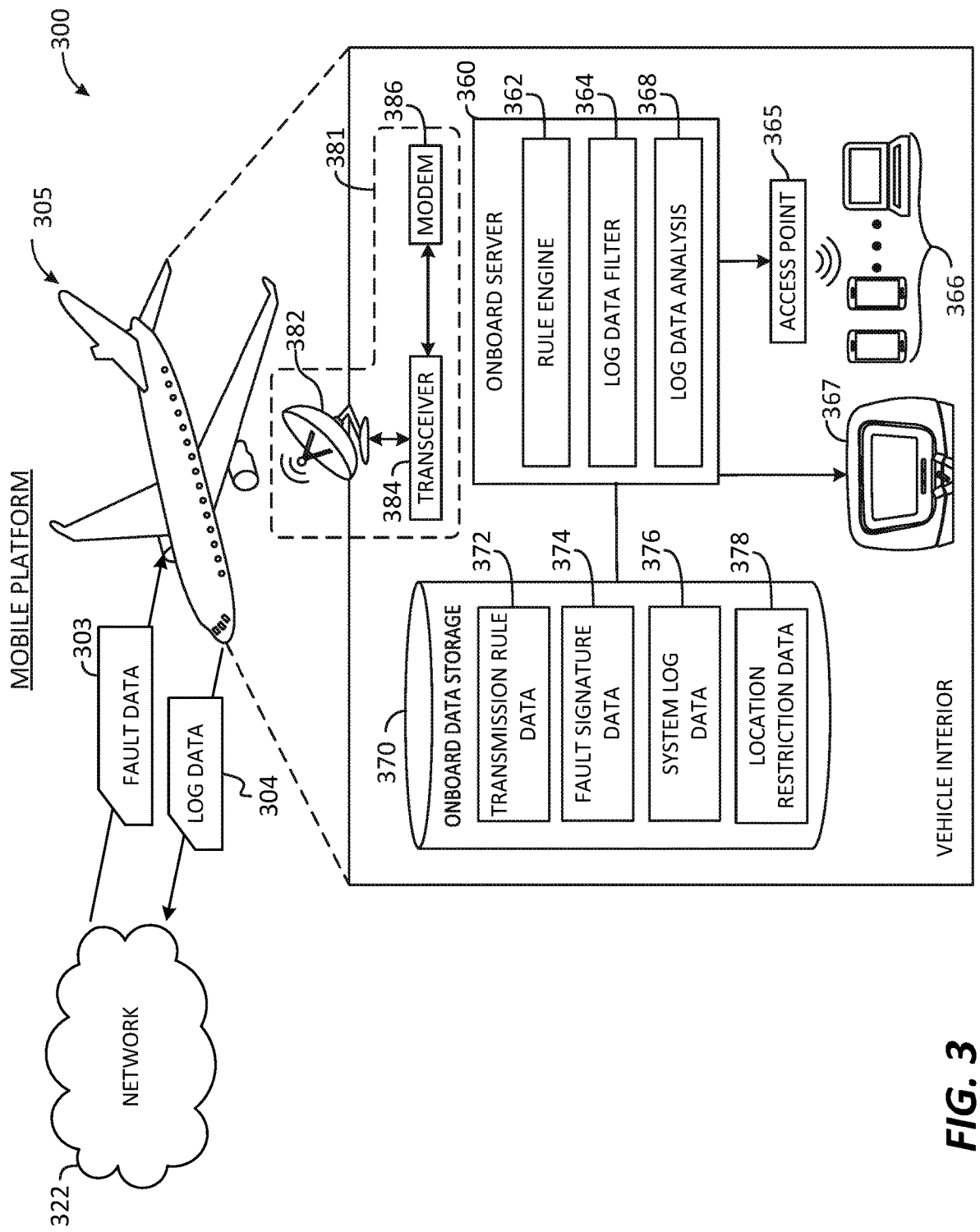
FIG. 3 illustrates an onboard monitoring system in accordance with one or more embodiments.

FIG. 3 illustrates an onboard data monitoring system 300 associated with a vehicle/mobile platform 305 in accordance with one or more embodiments. The onboard monitoring system comprises an onboard server 360 and an associated onboard data store 370, which may comprise non-volatile data storage media and/or may be configured to store certain data including transmission rule data 372, fault signature data 374, system log data 376, and/or location restriction data 378. While the onboard server 360 and onboard data storage 370 are shown as separate components in FIG. 3, the onboard server 360 and onboard data storage 370 may be combined into a single device or may be different devices.

The mobile platform 305 may comprise a network access terminal 381 (i.e., network interface) for establishing a connection with an external access network, such as a satellite network, cellular network, or other network. The network access terminal 381 comprises one or more of an antenna 382, a transceiver 384, and a modem 386, for facilitating network communications. The antenna 382 may be in communication with the transceiver 384, which may be in communication with the modem 386. A wireless access point 365 may be in communication with the onboard server 360 and/or other network access components (not shown). One or more service access devices 366, 367 may comprise control circuitry configured to execute one or more applications that provide an interface for users/passengers on the mobile platform 305 to obtain and/or consume media content items media content libraries onboard the mobile platform 305 and/or obtained from remote servers; the user may have the option to select/request one or more media content items from the interface. The network access terminal 381 may provide connectivity between the onboard server 360 and the on-ground server, e.g., via a satellite and gateway (see FIG. 1). In some embodiments, the onboard server 360 may transmit and/or obtain data from various passenger service devices and/or service access devices onboard the vehicle 305 via the network access terminal 381 or other network interface for transmission of system log data and/or other data. In some embodiments, the network access terminal 381 may be configured to establish one or more wired and/or wireless connections with the passenger service devices and/or service access devices. Passenger service devices may transmit system log data 376 and/or other data to the onboard server 360 one or more connections established by the network access terminal 381. The network access terminal 381 may be configured to establish multiple connections between various devices, including passenger service devices, service access devices, and the onboard server 360.

For convenience, the following description refers to the mobile platform 305 as a vehicle, such as an airplane. The electronic devices 366, 367 disposed within the vehicle 305 can include any type of personal electronic devices (e.g., smartphones, laptops, tablets, netbooks, and the like) brought onto the vehicle 305 by passengers, as well as passenger seatback systems 367 or other devices on the vehicle 305. The electronic devices 366, 367 can be configured to communicate with the onboard server 360 via a communication link that can be wired and/or wireless. The communication link can be, for example, part of a local area network, such as a wireless local area network (WLAN) supported by the WAP/access point 365. One or more access points 365 can be distributed about the vehicle 305, and can, in conjunction with the server 360, provide traffic switching and routing functionality; for example, as part of a WLAN extended service set (ESS), etc.

Passengers on the vehicle may interface with the onboard server 360 in any suitable or desirable way. For example, media content may be presented to passengers using electronic displays of personal electronic devices 366 associated with the passengers, such as through a web browser application, native application, or the like, or using an interface associated with a vehicle-integrated media system, such as the seatback media system 367. The onboard server 360 may serve as a media delivery system and/or content server for providing media content for presentation using the personal electronic devices (e.g., PED 366) and/or presentation systems associated with the vehicle 305 (e.g., seatback media presentation devices or systems 367).

The onboard server 360 may comprise control circuitry for implementing functionality in accordance with embodiments of the present disclosure. As shown in FIG. 3, the onboard server 360 may comprise transmission rule engine 362 circuitry, system log data filter 364 circuitry, and/or system log data analysis 368 circuitry. While the onboard server 360 is shown in FIG. 3 as comprising transmission rule engine 362 circuitry, one or more remote servers may also or alternatively comprise transmission rule engine 362 circuitry and may transmit transmission rule data 372 as and/or along with other fault data 303 which may be received at the vehicle 305. Generated and/or obtained transmission rule data 372 may be stored in the onboard data storage 370 for use in filtering system log data 304 prior to transmission to remote servers via the network 322.

Fault signature data 374 transmitted from remote servers may be stored at the onboard data storage 370 for use in analysis of system log data. Fault signature data 374 may be obtained as and/or along with other fault data 303 at the vehicle 305. In some embodiments, fault signature data 374 may be generated at the vehicle 305 (e.g., by the onboard server 360). System log data 376 generated at the vehicle 305 (e.g., by the access point 365, modem 386, and/or other passenger service devices) may be stored at the onboard data storage 370 for use in generating transmission rules, performing system log data analysis, and/or filtering the system log data 376 for transmission to remote servers.

In some embodiments, transmission rule data 372 may be associated with particular characteristics of faults and/or particular results of comparisons between system log data 376 and fault signature data 374. For example, in comparing system log data 376 to fault signature data 374, the onboard server 360 (e.g., by the log data analysis 368 circuitry) may determine that the system log data 376 represents relatively poor data rate values (e.g., data rate values that do not meet or exceed threshold data rate values provided by the fault signature data 374). The transmission rule data 372 may include a set of transmission rule data 372 that is fault-specific. For example, the set of transmission rule data 372 may be associated with and/or otherwise specific to faults involving poor data rate values and/or other types of faults. Accordingly, if the fault detector detects a fault involving poor data rate values, the set of transmission rule data 372 that is specific to faults involving poor data rate values may be applied when filtering the system log data 376 for transmission.

In some embodiments, in addition to filtering system log data 376 based on transmission rule data 372, the system log data filter 364 circuitry may filter system log data 376 based on location restriction data 378, which may be stored at the onboard data storage 370. In some embodiments, location restriction data 378 may be obtained from remote servers via fault data 303 transmissions and/or may be generated by the onboard server 360. Location restriction data 378 may be indicative of restrictions preventing certain types and/or sets of data from being transmitted to certain geographic locations. In some embodiments, location restriction data 378 may include association data (e.g., pointers) between geographic areas and types of data and/or particular data sets. In one use case, certain data sets and/or data types may be restricted from transmission to remote computing devices located in certain geographic areas. For example, a first data type (e.g., data rate values) may be restricted from transmission to computing devices located outside of Europe.

The transfer of the system log data 304 and/or fault data 303 during travel, such as in-flight with respect to aircraft embodiments, may advantageously involve the transmission of the system log data 304 over the same communication link (e.g., satellite network connection) used to concurrently provide onboard media service to passengers. For example, the onboard server 360 may be configured to provide media streaming to the media presentation devices 366, 367 (e.g., personal electronic devices) using a satellite network connection during travel, as well as transmit filtered system log data 304 and/or receive fault data 303 over the same satellite network connection and provide onboard media monitoring in connection with the same during the same travel period. Accordingly, any reductions in the amount of system log data 304 transmitted from the vehicle 305 may be advantageous in freeing up resources for other purposes. As such, filtering out portions of system log data 376 to select highly useful data for data transmissions may provide advantages in improved efficiency and/or quality of service.

The log data analysis 368 circuitry may be configured to analyze system log data 376 collected from passenger service devices and/or service access devices to detect faults related to a passenger service provided at the vehicle 305. Faults may be representative of any abnormal and/or suboptimal performance represented by system log data. In some embodiments, when a fault is detected, the log data analysis 368 circuitry may be configured to generate an event. An event and/or command may be any data item (e.g., a notification) configured to trigger actions at the system log data filter 364 circuitry, onboard data store 370, passenger service devices, service access devices, and/or network access terminal 381. As a result of the generated event, the system log data filter 364 circuitry may automatically collect service log data 376 and filter the service log data 376 in preparation for transmission of a subset of the service log data 376 to a remote server. Service log data 376 collected in response to an event may be associated with a generated ticket or other data set that may be indicative of the detected fault that prompted generation of the event. When the filtered system log data 304 is received at a remote server, the ticket may provide additional (e.g., contextual) information which may be used by the remote server to detect and/or diagnose a cause of the detected faults based on the system log data 304. In some embodiments, fault detection may prompt generation of and/or contribution to a series of one or more commands (e.g., a runbook) that may be performed in response to the detected fault.

In some embodiments, troubleshooting data may be received from remote servers as fault data 303 in response to transmission of filtered system log data 304. The troubleshooting data may providing instructions for responding to faults detected from system log data 376 generated at the vehicle 305 and/or transmitted as a filtered subset of system log data 304 to a remote server. In some embodiments, receipt of troubleshooting data may prompt generation of an event and/or transmission of one or more commands which may automatically cause performance of various troubleshooting functions, which may include restarting and/or updating various passenger service devices and/or transmitting notifications and/or messages to service access devices (e.g., crew devices). For example, a message may include instructions for a crew member to restart a passenger service device. In optional embodiments, troubleshooting data may be generated and/or other troubleshooting functions may be performed automatically onboard a vehicle in response to detected faults without requiring system log data 304 to be transmitted to a remote server.

In optional embodiments, the onboard server 360 may comprise control circuitry for collecting various event data from remote servers and/or passenger service devices. Collected event data may provide instructions to perform various actions, which may include filtering system log data 376, performing troubleshooting functions, analyzing system log data 376, and/or generating transmission rule data. The control circuitry may further be configured to forward the event data to various components (e.g., the transmission rule engine 362 circuitry and/or system log data filter 364 circuitry) for performing actions in response to the obtained event data.

In some embodiments, fault data 303 obtained from remote servers may comprise service log data. The service log data obtained from remote servers may include log data generated at the mobile platform, at a different mobile platform, and/or at an on-ground server.

Data Monitoring Processes

Figure 4:
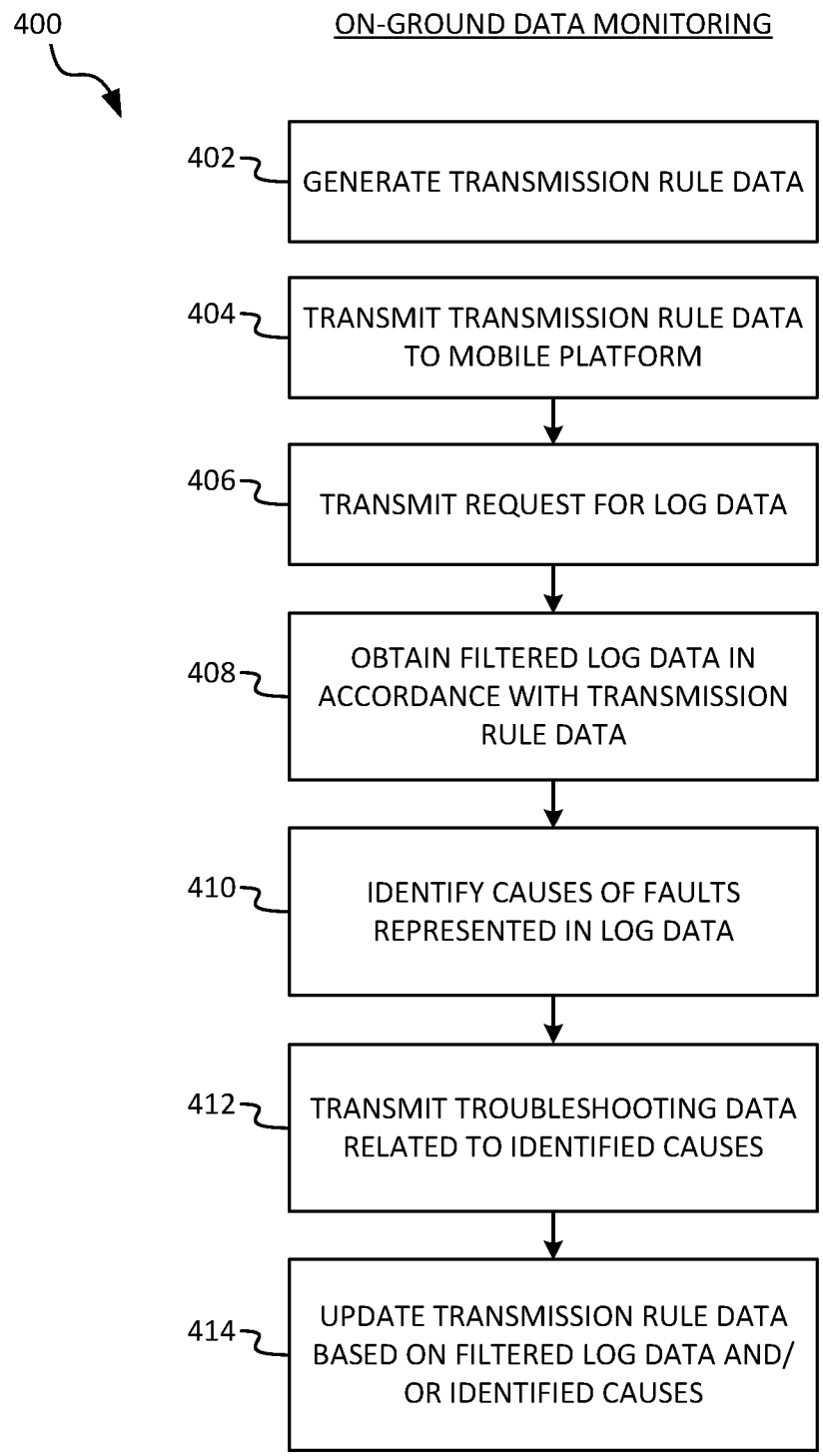
FIG. 4 illustrates a process for on-ground data monitoring in accordance with one or more embodiments.

FIG. 4 illustrates a process 400 for on-ground data monitoring in accordance with embodiments the present disclosure. The process 400 involves, at block 402, generating transmission rule data. In some embodiments, transmission rule data may be generated automatically using stored and/or obtained system log data. In optional embodiments, transmission rule data may be inputted by users. Transmission rule data may be categorized in a variety of ways, including in a fault-specific manner. For example, certain sets of transmission rule data may be associated with particular faults. When a particular fault is detected, the fault may be matched to a generated and/or stored set of transmission rule data.

At block 404, the process 400 involves transmitting the generated transmission rule data to one or more mobile platforms. The transmission rule data may be applied by the mobile platforms in sending system log data to on-ground servers. For example, the mobile platforms may apply the transmission rule data to remove unnecessary data from sets of system log data before sending the log data to on-ground servers, thereby minimizing transmission data quantity and maximizing transmission pipeline bandwidth.

At block 406, the process 400 involves transmitting a request for system log data to a mobile platform. Requests may be transmitted in response to particular occurrences (e.g., a failed transmission between a mobile platform and an on-ground server) and/or on a periodic basis. In some embodiments, on-ground servers may not be required to transmit requests for system log data. Rather, mobile platforms may transmit system log data in a periodic manner and/or in response to particular occurrences (e.g., detected faults at a mobile platform).

At block 408, the process 400 involves obtaining filtered system log data from mobile platforms. The filtered system log data may have been filtered at the mobile platform in accordance with the generated and transmitted transmission rule data. Accordingly, the filtered system log data may include sufficient data for identifying and/or diagnosing causes of faults related to passenger service devices at the mobile platforms. In some embodiments, the filtered system log data may include tickets and/or other indicators of specific faults and/or types of faults detected at the mobile platform, including specific performance metrics having measured values that fell below threshold values and/or specific passenger service devices experiencing issues. The indicators of faults and/or types of faults may be used in identifying and/or diagnosing the causes of the faults.

At block 410, the process 400 involves identifying causes of faults represented in the obtained system log data. In some embodiments, identification of the causes of faults may be performed automatically by analysis of the obtained system log data. For example, the obtained system log data may be compared to stored log data patterns having known causes to determine a match between the obtained data and the stored data. In optional embodiments, identification of causes of faults may be performed by users and fault cause data may be provided as user input.

At block 412, the process 400 involves transmitting troubleshooting data related to the identified causes of the faults to one or more mobile platforms. The troubleshooting data may be stored in on-ground data storage and/or may include pointers and/or other association data to indicate associations between sets of troubleshooting data and various known causes of faults. For example, it may be determined (at block 410) that a cause of performance fault is a malfunctioning modem in need of a restart. The troubleshooting data may indicate that, in the case of a malfunctioning modem, the modem should be restarted. Accordingly, troubleshooting data comprising instructions to restart a modem may be transmitted to the mobile platforms.

At block 414, the process 400 involves updating the transmission rule data stored at on-ground storage based on the obtained filtered system log data and/or based on the identified cause or causes of faults. In some embodiments, transmission rule data may be automatically and/or iteratively updated based on any newly obtained data. In this way, the transmission rule data may be refined over time to improve accuracy in diagnosing causes of faults as well as further minimizing quantities of data transmitted between mobile platforms and on-ground servers.

Figure 5:
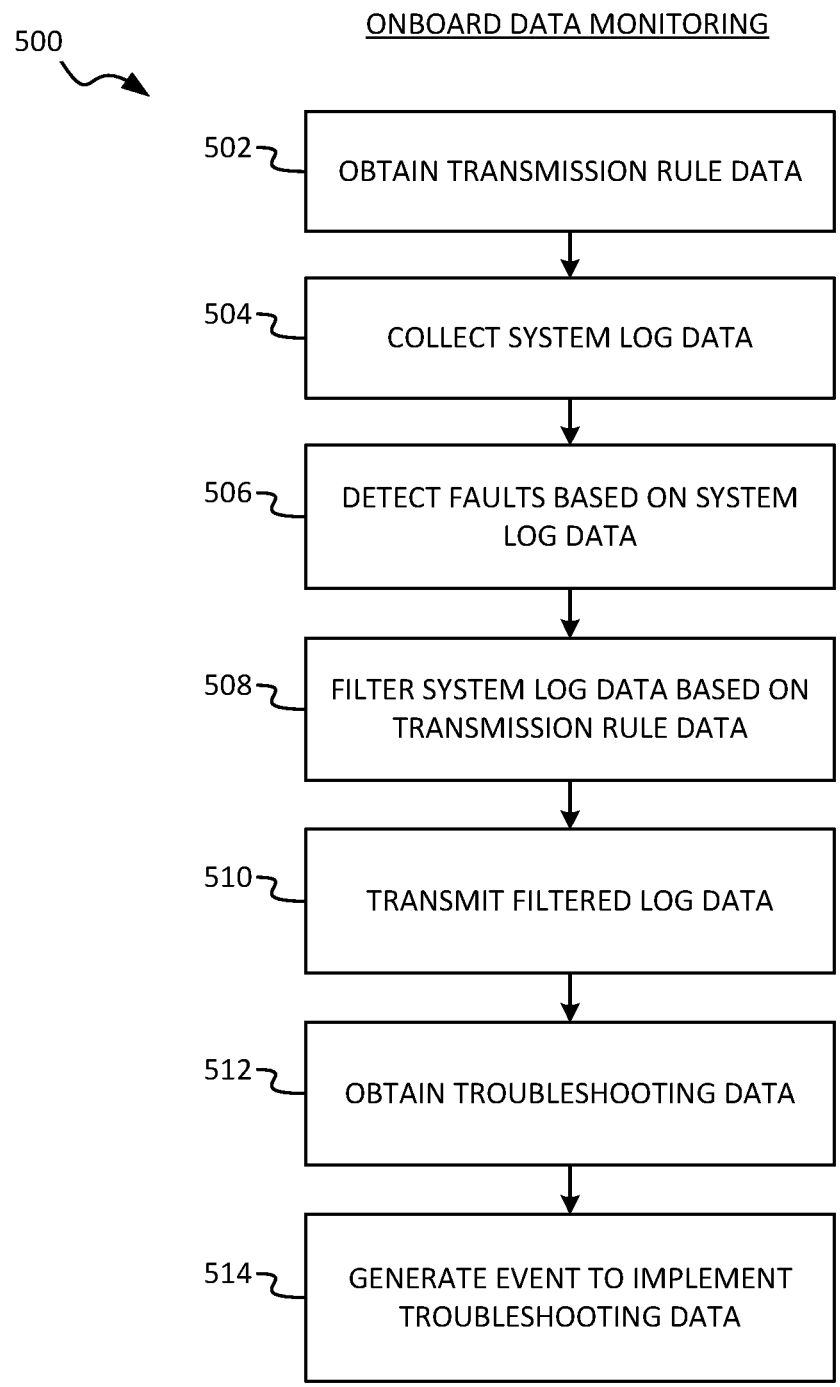
FIG. 5 illustrates a process for onboard data monitoring in accordance with one or more embodiments.

FIG. 5 illustrates a process 500 for data monitoring onboard a vehicle or other mobile platform according to one or more embodiments of the present disclosure. At block 502, the process 500 involves obtaining transmission rule data. In some embodiments, transmission rule data may be obtained at the vehicle from a remote/on-ground server. In optional embodiments, an onboard computing system may comprise rule engine circuitry configured to generate the transmission rule data.

At block 504, the process 500 involves collecting system log data form various passenger service devices (e.g., modems, WAPs, etc.) onboard the vehicle. The system log data may be related to a passenger service provided onboard the vehicle. For example, the passenger service may involve provision of media content items and/or network (e.g., Internet) service to service access devices (e.g., PEDs, crew devices, seatback entertainment systems, etc.). In some embodiments, service log data may be collected in a periodic and/or continuous manner and may be monitored and/or processed to detect faults related to the passenger service devices.

At block 506, the process 500 involves detecting one or more faults related to the passenger service devices based on the collected system log data. Detecting faults may involve comparison of system log data to fault signatures, which may include threshold values for various performance metrics included in system log data. Fault signatures may be obtained from on-ground servers and/or may be generated onboard the vehicle.

At block 508, the process 500 involves filtering the collected system log data based on the obtained transmission rule data. In some embodiments, filtering may be performed in response to detecting faults and/or may be performed periodically and/or sporadically. The transmission rule data may provide rules for excluding certain data from the system log data to minimize the amount of data transmitted between the vehicle and various on-ground servers.

At block 510, the process 500 involves transmitting the filtered system log data to one or more on-ground servers. The filtered system log data may include various tickets and/or other indicators for providing context relating to detected faults related to the filtered system log data. For example, if low data rate values were detected in the system log data, the filtered system log data may include an indicator indicating that low data rate values were detected with respect to the system log data.

At block 512, the process 500 involves obtaining troubleshooting data from one or more on-ground servers in response to the transmitted filtered log data. The troubleshooting data may include instructions for correcting the detected faults and/or any previously undetected faults related to the passenger service devices. In optional embodiments, the vehicle may store various troubleshooting data and perform troubleshooting procedures without requiring transmissions of troubleshooting data from on-ground servers. For example, an on-ground server may send data indicating a type of troubleshooting data (e.g., an identification code for certain troubleshooting data) and the mobile platform may perform a lookup function to access locally stored troubleshooting data based on the indicated type.

At block 514, the process 500 involves generating event data to implement the troubleshooting data. Event data may include instructions which may be transmitted to various passenger service devices and/or service access devices for correcting faults related to the passenger service devices. For example, a notification may be sent to a crew device to instruct the crew to restart a passenger service device to correct faults.

General Comments

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

Reference throughout this disclosure to "some embodiments," "certain embodiments," or "an embodiment" means that a particular feature, structure or characteristic described in connection with the embodiment can be included in at least some embodiments. Thus, appearances of the phrases "in some embodiments," "in certain embodiment," or "in an embodiment" in various places throughout this specification are not necessarily all referring to the same embodiment, and may refer to one or more of the same or different embodiments. Furthermore, embodiments disclosed herein may or may not be embodiments of the invention. For example, embodiments disclosed herein may, in part or in whole, include non-inventive features and/or components. In addition, the particular features, structures or characteristics can be combined in any suitable manner, as would be apparent to one of ordinary skill in the art from this disclosure, in one or more embodiments.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Methods and processes described herein may be embodied in, and partially or fully automated via, software code modules executed by one or more general and/or special purpose computers. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A data transmission system for a vehicle, the data transmission system comprising:
    a data storage media; and
    control circuitry coupled with the data storage media and configured to:
        receive, during a trip of the vehicle, system log data from one or more passenger service devices onboard the vehicle via a network interface, the system log data relating to a passenger service provided on the vehicle;
        compare the system log data to a condition for detecting faults;
        detect, based on comparing the system log data to the condition for detecting faults, a fault related to a network service of a passenger service device of the one or more passenger service devices onboard the vehicle;
        filter, in response to detecting the fault, the system log data based on transmission rule data to generate a subset of the system log data, the transmission rule data comprising one or more rules for filtering the system log data;
transmit the subset of the system log data to a remote computing device;
receive troubleshooting instruction data from the remote computing device in response to transmitting the subset of the system log data; and
respond to receipt of the troubleshooting instruction data, during the trip, by causing performance of one or more troubleshooting functions.

2. The data transmission system of claim 1, wherein the control circuitry is further configured to:
store the condition for detecting faults in the data storage media before comparing the system log data to the condition for detecting faults.

3. The data transmission system of claim 1, wherein the condition for detecting faults comprises one or more log signatures.

4. The data transmission system of claim 1, wherein the control circuitry is further configured to:
store the transmission rule data in the data storage media before filtering the system log data.

5. The data transmission system of claim 1, wherein the transmission rule data is fault-specific and the one or more rules for filtering the system log data are associated with the fault.

6. The data transmission system of claim 1, wherein the control circuitry is further configured to:
receive the condition for detecting faults from the remote computing device.

7. The data transmission system of claim 1, wherein causing the performance of one or more troubleshooting functions comprises:
transmitting one or more commands to the passenger service device based on the troubleshooting instruction data, via the network interface.

8. The data transmission system of claim 7, wherein the one or more commands comprise a request to restart the passenger service device.

9. The data transmission system of claim 1, wherein causing the performance of one or more troubleshooting functions comprises:
transmitting, via the network interface, message data to one or more service access devices onboard the vehicle based on the troubleshooting instruction data.

10. The data transmission system of claim 1, wherein the control circuitry is further configured to:
receive location data for the vehicle via the network interface; and
filter the system log data based on the location data.

11. The data transmission system of claim 1, wherein the one or more passenger service devices comprises one or more wireless access points, servers, or modems.

12. A method of managing data transmission on a vehicle, the method comprising:
receiving, during a trip of the vehicle, system log data from one or more passenger service devices onboard the vehicle via a network interface, the system log data relating to a passenger service provided on the vehicle;
comparing the system log data to a condition for detecting faults;
detecting, based on comparing the system log data to the condition for detecting faults, a fault related to a network service of a passenger service device of the one or more passenger service devices;
filtering, in response to detecting the fault, the system log data based on transmission rule data to generate a subset of the system log data, the transmission rule data comprising one or more rules for filtering the system log data,
transmitting the subset of the system log data to a remote computing device;
receiving troubleshooting instruction data from the remote computing device in response to transmitting the subset of the system log data; and
responding to receipt of the troubleshooting instruction data, during the trip, by causing performance of one or more troubleshooting functions.

13. The method of claim 12, further comprising storing the condition for detecting faults in a data storage media before comparing the system log data to the condition for detecting faults.

14. The method of claim 12, wherein the condition for detecting faults comprises one or more log signatures.

15. The method of claim 12, further comprising:
storing the transmission rule data in a data storage media before filtering the system log data.

16. The method of claim 12, wherein the transmission rule data is fault-specific and the one or more rules for filtering the system log data are associated with the fault.

17. The method of claim 12, further comprising:
receiving the condition for detecting faults from the remote computing device.

18. The method of claim 12, wherein causing the performance of one or more troubleshooting functions comprises:
transmitting one or more commands to the passenger service device based on the troubleshooting instruction data, via the network interface.

19. The method of claim 18, wherein the one or more commands comprise a request to restart the passenger service device.

20. The method of claim 12, wherein causing the performance of one or more troubleshooting functions comprises:
transmitting, via the network interface, message data to one or more service access devices onboard the vehicle based on the troubleshooting instruction data.

21. The method of claim 12, further comprising:
receiving location data for the vehicle via the network interface; and
filtering the system log data based on the location data.

22. The method of claim 12, wherein the one or more passenger service devices comprises one or more wireless access points, servers, or modems.

23. A method of managing data transmission on a vehicle, the method comprising:
transmitting, via a network interface, a set of transmission rule data of a transmission rule library to a remote computing device onboard the vehicle, the set of transmission rule data providing instructions for filtering system log data;
receiving from the vehicle, via the network interface and during a trip of the vehicle, a set of system log data generated at the vehicle, wherein the set of system log data is related to passenger service devices onboard the vehicle, and wherein the set of system log data satisfies the set of transmission rule data;
identifying a cause of a fault related to a network service of the passenger service devices based on the set of system log data; and
transmitting, via the network interface and during the trip, a set of troubleshooting instruction data of a transmission rule library to the remote computing device, wherein the set of troubleshooting instruction data is associated with the identified cause of the fault.

24. The method of claim 23, wherein the set of transmission rule data is fault-specific and provides the instructions for filtering system log data related to the fault.

25. The method of claim 23, wherein the set of transmission rule data comprises rules for filtering out data that is unrelated to a performance metric.

26. The method of claim 25, wherein the performance metric is one of data rate, ping latency, data usage, ping success, or load time.

27. The method of claim 25, wherein identifying the cause of the fault comprises:
   comparing the set of system log data to threshold values for the performance metric.

28. The method of claim 23, further comprising:
   updating the transmission rule library based on the identified cause of the fault.

\* \* \* \* \*